No. 614,952. Patented Nov. 29, 1898.
W. H. HOLLOWAY.
BICYCLE BRAKE.
(Application filed Nov. 26, 1897.)
(No Model.)

WITNESSES:
L. E. Snow.
C. Chambers.

INVENTOR
William H. Holloway
BY
J. H. Snow.
ATTORNEY.

UNITED STATES PATENT OFFICE.

WILLIAM H. HOLLOWAY, OF BRAZIL, INDIANA.

BICYCLE-BRAKE.

SPECIFICATION forming part of Letters Patent No. 614,952, dated November 29, 1898.

Application filed November 26, 1897. Serial No. 659,787. (No model.)

*To all whom it may concern:*

Be it known that I, WILLIAM H. HOLLOWAY, a citizen of the United States, residing at Brazil, in the county of Clay and State of Indiana, have invented a new and useful Bicycle Brake and Foot-Rest, of which the following is a specification.

My invention relates to improvements in bicycle brakes and foot-rests combined which may be attached to any make of wheel, and the brake can be applied by a downward move of the heel of the rider while the toe is on the stationary rest while coasting, and the brake is removed from the wheel by a spring without removing the foot from the rest.

Figure 1:
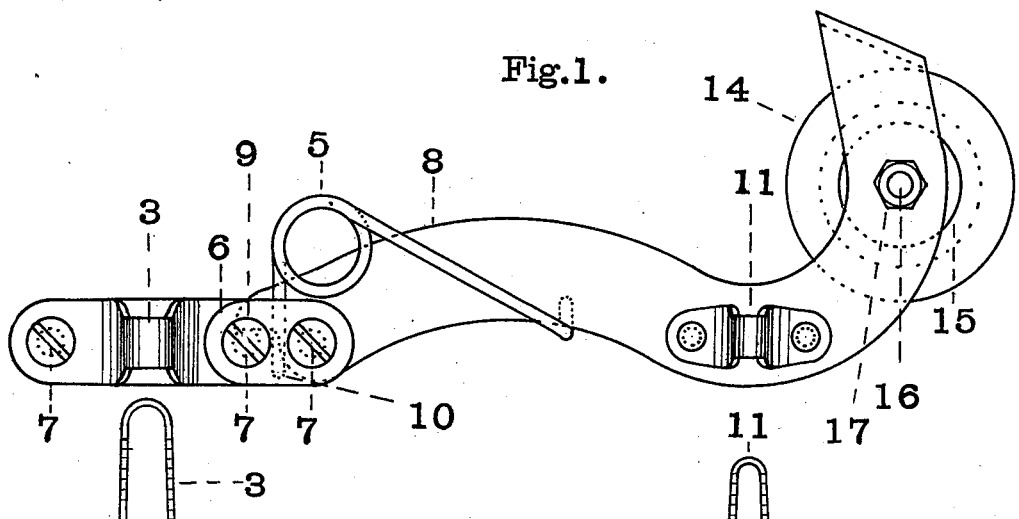
Figure 2:
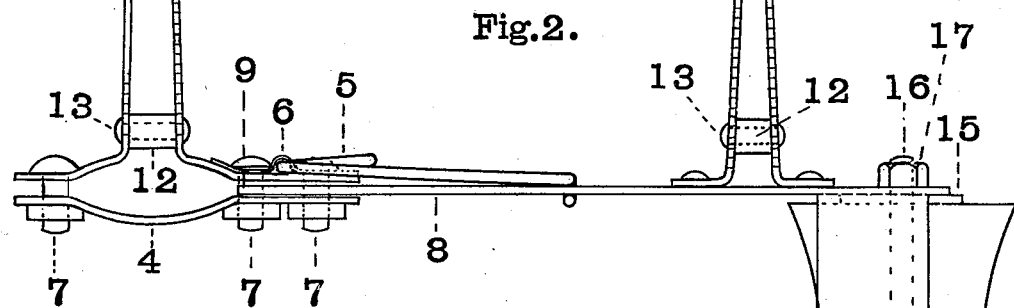
Figure 3:
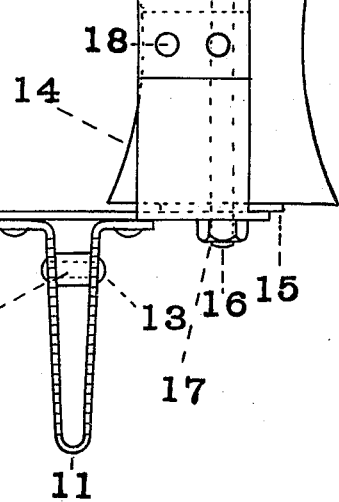

In the drawings, Figure 1 is a side view of the brake. Fig. 2 is a top view of the brake. Fig. 3 is a detail view of a portion of the device designed to illustrate more clearly the hook 9.

Similar numerals of reference indicate corresponding parts in all the figures of the drawings.

3 designates the foot-rest, which forms one side of the clamp to hold the brake to the fork of the wheel. 4 designates the opposite side of the clamp which holds the brake to the fork of the wheel.

5 designates a spring adapted to raise the brake when not in use by having a hook turned on one end and a coil in the center and having a hook turned on the opposite end to fit in a hole in the front rest at the point indicated by 10.

6 indicates a thin plate fitted over the spring 5 to hold it in place.

7 designates screws passing through the plate 6, the rest 3, and the plate 4 and through the brake.

8 8 designate the brake-frame, through which passes one of the screws 7.

9 designates the point of the brake-frame resting on the top of one of the screws 7 to prevent the brake from being raised too high by the spring 5 when out of use.

10 designates a hole in the rest 3 where the end of the spring 5 is inserted to keep it in the proper position so the opposite end will raise the brake-frame.

11 designates the rest for the heel while the toe is resting on the rest 3.

12 designates a collar.

13 designates a rivet passed through the rests 11 and 3 and the collar 12 to stiffen the rests which are secured to the brake-frame 8.

14 designates a spool which comes in contact with the tire of the bicycle.

15 designates a metal washer which fits between the spool 14 and the frame 8.

16 designates a bolt passing through the frame 8, the washer 15, and the spool 14.

17 designates two nuts which tighten the spool 14 between the ends of the frame 8.

18 designates the rivets holding the frame 8 together over the top of the spool 14.

The operation of the brake and rest is as follows: The screws 7 are removed and the toe-rest 3 and the plate 4 put on either side of the bicycle-fork, and the screws are then replaced and the rest is clamped to the fork by tightening the screws 7, the brake extending toward the rear of the wheel. The springs 5 will then raise the brake up and the point 9 on the brake 8 will strike the screw 7 and prevent the brake from being raised too high. When it is necessary to put the brake on, the rider places the toe on the rest 3 and the heel on the rest 11 and bears down with the heel, thus pressing the spool 14 on the bicycle-tire until the desired friction is secured.

The spool 14 is loose on the belt 16, but may be tightened by means of the nuts 17; but this is not necessary to the successful operation of the brake, as the simple pressing of the spool 14 against the tire will form all the friction necessary.

Having thus described my invention, I claim—

In a combined bicycle brake and foot-rest, the combination with clamps designed to be secured to the bicycle-frame and composed respectively of clamping-plates one of which is formed with a laterally-extending foot-rest, of a plurality of retaining-screws passed through one end of the clamping members of each clamp, a brake-frame, a roller and heel-rests carried by said frame, the brake-frame being pivoted upon one of the screws above named and provided with terminal projections designed to abut against either of said screws to limit the movement of the frame in one direction, and springs secured to the clamps and operatively connected to the brake-frame for retaining the roller out of engagement with the wheel, substantially as specified.

In testimony that I claim the foregoing as my own I have hereunto affixed my signature in the presence of two witnesses.

WILLIAM H. HOLLOWAY.

Witnesses:
F. J. JAMES,
JACOB HERR.